(12) United States Patent
Matsushita et al.

(10) Patent No.: US 6,944,934 B2
(45) Date of Patent: Sep. 20, 2005

(54) SMALL-SIZED MOTOR AND MANUFACTURING METHOD THEREOF

(75) Inventors: Ikuo Matsushita, Matsudo (JP); Hideo Tamura, Matsudo (JP); Kenji Tsuyama, Matsudo (JP)

(73) Assignee: Mabushi Motor Co., Ltd., Chiba (JP)

( * ) Notice: Subject to any disclaimer, the term of this patent is extended or adjusted under 35 U.S.C. 154(b) by 0 days.

(21) Appl. No.: 10/386,724

(22) Filed: Mar. 12, 2003

(65) Prior Publication Data

US 2003/0173848 A1 Sep. 18, 2003

Related U.S. Application Data

(62) Division of application No. 10/233,090, filed on Aug. 28, 2002, now Pat. No. 6,707,219.

(30) Foreign Application Priority Data

Oct. 4, 2001 (JP) .................................... 2001-308432

(51) Int. Cl.$^7$ ............................................. H02K 15/02
(52) U.S. Cl. ............................. 29/598; 29/597; 29/596; 29/606; 29/608; 29/607; 29/860; 29/854
(58) Field of Search .......................... 29/596, 597, 606, 29/860, 598, 264, 607, 854, 831

(56) References Cited

U.S. PATENT DOCUMENTS

| | | | | |
|---|---|---|---|---|
| 3,809,938 A | * | 5/1974 | Sjoberg et al. | 310/254 |
| 6,510,603 B1 | * | 1/2003 | Ebihara et al. | 29/598 |
| 6,601,287 B2 | * | 8/2003 | Pop, Sr. | 29/596 |

* cited by examiner

*Primary Examiner*—Darren Schuberg
*Assistant Examiner*—Iraj A. Mohandesi
(74) *Attorney, Agent, or Firm*—McGlew and Tuttle, P.C.

(57) ABSTRACT

In the case of a small-sized motor of the present invention, a printed board to which an electric circuit including an electric element is attached is mounted on a case cover. The printed board has a soldering part to be connected to a member attached to an interior of the case cover for being connected to an electric power source supplied from an outside and a soldering part to be connected to a projection in a notch provided on an opening part side of the metal case to body-earth the electric circuit. In the soldering part for the body-earthing, at the time of assembling the motor, after fitting the case cover to the metal case opening part, a pair of electrodes are brought into contact from an outside of the metal case near the soldering part, to weld the soldering part by a principle of the electric resistance welding. Consequently, it is possible to easily and surely body-earth the earth of the electric circuit to the metal case, and to reduce the number of the motor assembling steps so that the assembling can be performed with a good working property.

2 Claims, 4 Drawing Sheets

L : Choke Coil
C1 to C3 : Chip Capacitor

SMALL-SIZED MOTOR AND MANUFACTURING METHOD THEREOF

This is a Divisional of application Ser. No. 10/233,090 filed Aug. 28, 2002 now U.S. Pat. No. 6,707,219, and the entire disclosure of this prior application is considered to be part of the disclosure of the accompanying application and is hereby incorporated by reference therein.

BACKGROUND OF THE INVENTION

1. Field of the Invention

The present invention relates to a small-sized motor, and more particularly relates to a small-sized motor wherein an electric element such as a capacitor is attached to a case cover for being used for the driving of electrical equipment or the like.

2. Description of the Related Art

A small-sized motor is widely used in a vehicle electrical apparatus such as a vehicle door lock opening and closing device, an electrically powered mirror mirror-surface driving and containing device, or an air conditioner. In the case of the small-sized motor and the peripheral equipment like this, the reduction of electric noise caused at the time of operation is required, and regulations are laid down all over the world. CISPR25 as an international standard, GMW3100/3097 as a carmaker standard, or the like can be mentioned.

In order to reduce the electric noise, in the case of a small-sized motor, it is necessary to directly attach the electric element such as a capacitor or a choke coil to the motor. Therefore, conventionally, it has been performed that the electric element is arranged and wired on a printed board, and that this printed board is mounted on the motor. However, in the case of a mounting method like this, such a work is necessary, where a special earth lead wire for earthing the electric circuit is connected to the printed board in advance, and furthermore, this printed board is mounted on a metal case of the motor, and after that, the above described earth lead wire is connected, for example, by soldering.

In order to reduce the man-hour of such a troublesome work, a printed board mounting method as shown in FIG. 6 is conventionally well known (refer to Japanese Utility Model Publication No. 63-127254). In FIG. 6, a printed board 25 to which an electric element (omitted in the drawing) is attached is structured such that it is mounted to a metal case 1 where the motor main body (omitted in the drawing) is contained, and after that, furthermore, it is covered by a case cover (omitted in the drawing).

As shown in the drawing, to the metal case 1, a projecting needle part 26 projected from an opening end edge is provided, and in the meantime, corresponding to this projecting needle part 26, to the printed board 25, an engaging part 28 which makes the projecting needle part 26 pass to an earth electrode part 27 is provided. As shown in the drawing by an alternate long and short dash line and an arrow, in order to make the state where the projecting needle part 26 is inserted into the engaging part 28, the printed board 25 is mounted on the metal case 1, and after that, by performing the soldering of the projecting needle part 26 and the earth electrode part 27, the earth electrode part 27 of the printed board 25 and the metal case 1 are electrically connected through the solder.

Thus, it is enough for the purpose only to perform the soldering on the way of the motor assembling step, and therefore, it becomes possible to largely reduce the working man-hour in the earth executing step. However, in the case of such a prior art, the soldering is still needed as another step different from the motor assembling, and therefore, the reduction of the working man-hour is furthermore required. Furthermore, it is required to attach the electric element to the synthetic resin case cover with a good workability to efficiently attach it in a narrow space.

SUMMARY OF THE INVENTION

Therefore, it is an object of the present invention to solve such problems, and to perform the assembling with a good workability in such a way where an electric circuit composed of an electric element such as a chip capacitor attached on a printed board is attached to a case cover, and in the meantime, the earth (ground) of the electric circuit is easily and surely body-earthed to the metal case, and the number of the motor assembling steps is reduced.

The small-sized motor of the present invention includes: a hollow cylindrical metal case with a bottom where a magnet is attached to an inside periphery; a synthetic resin case cover which is fitted to close an opening part of the above described case; and a rotor where a laminated core, a winding wound around the above described laminated core, and a commutator are attached on a shaft. To this case cover, a printed board where an electric circuit including an electric element is attached is mounted. The printed board has a soldering part which is connected to a member attached to the interior of the case cover for being connected to an electric power source supplied from the outside and a soldering part which is connected to a projection in a notch provided on the opening part side of the above described metal case for body-earthing the earth of the electric circuit. In the soldering part for the body-earthing, at the time of assembling the motor, a pair of electrodes are brought into contact from the outside of the metal case near the above described soldering part to weld the above described soldering part by the principle of electric resistance welding, after fitting the case cover to the metal case opening part.

In the case of the manufacturing method of a small-sized motor of the present invention, after inserting a rotor where a laminated core, a winding wound around the above described laminated core, and a commutator are attached on a shaft, into a hollow cylindrical metal case with a bottom where a magnet is attached to an inside periphery, a synthetic resin case cover is fitted to close an opening part of the above described case. To the case cover, a printed board where an electric circuit including an electric element is attached is mounted. The printed board has a soldering part which is connected to a member attached to the interior of the case cover for being connected to an electric power source supplied from the outside and a soldering part which is connected to a projection in a notch provided on the opening part side of the above described metal case for body-earthing the earth of the electric circuit. At the time of assembling the motor, after fitting the above described case cover to the metal case opening part, a pair of electrodes are brought into contact from the outside of the metal case near the soldering part for the body-earthing so that the above described soldering part may be welded by the principle of electric resistance welding.

BRIEF DESCRIPTION OF THE DRAWINGS

FIG. 3A is a view of an interior seen from an inside direction of the case cover, and FIG. 3B is a cross sectional view made by cutting the case cover shown in FIG. 3A at the center;

FIG. 4D is a view made by seeing an interior from an opening part of the metal case, and a view made by seeing this view from an upper side is FIG. 4A, and a view shown by an upper half cross section seen from the side is FIG. 4C. FIG. 4B is a view showing an expanded projection 10 provided on the opening part side of the metal case;

DETAILED DESCRIPTION OF THE PREFERRED EMBODIMENTS

Figure 1:
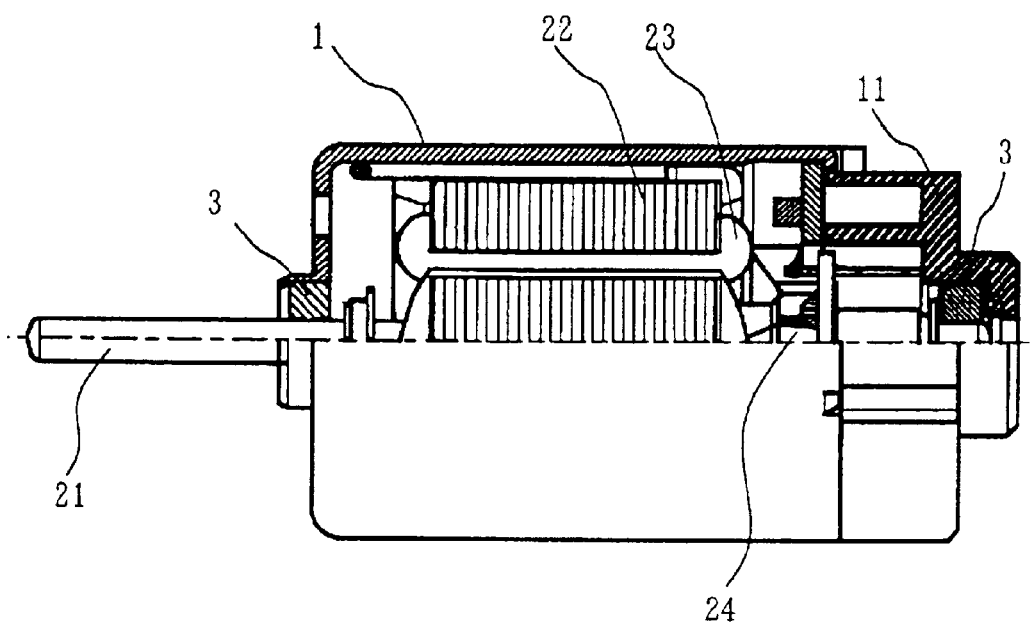
FIG. 1 is a vertical cross sectional view showing a total of a small-sized motor to which the present invention can be applied by an upper half cross section.

FIG. 1 is a vertical cross sectional view showing a total of a small-sized motor to which the present invention can be applied by an upper half cross section. To an inside periphery of a case 1 formed like a hollow cylinder with a bottom by a metal material, a magnet 2 (refer to FIG. 4D) is attached. To an opening part of this case 1, a synthetic resin case cover 11 is fitted, and the opening part is closed by the case cover 11. In a center of the case cover 11, a bearing 3 for a shaft 21 is contained.

The other end of the shaft 21 is supported by a bearing 3 provided at a center of the bottom part of the hollow cylindrical case 1 with a bottom. To this shaft 21, a laminated core 22, a winding 23 wound on the above described core 22, and a commutator 24 are usually provided to compose a rotor of a small-sized motor. Then, each of a pair of carbon brushes coming into contact with this commutator 24 is attached to the brush device fixed to the case cover 11.

Figure 3:
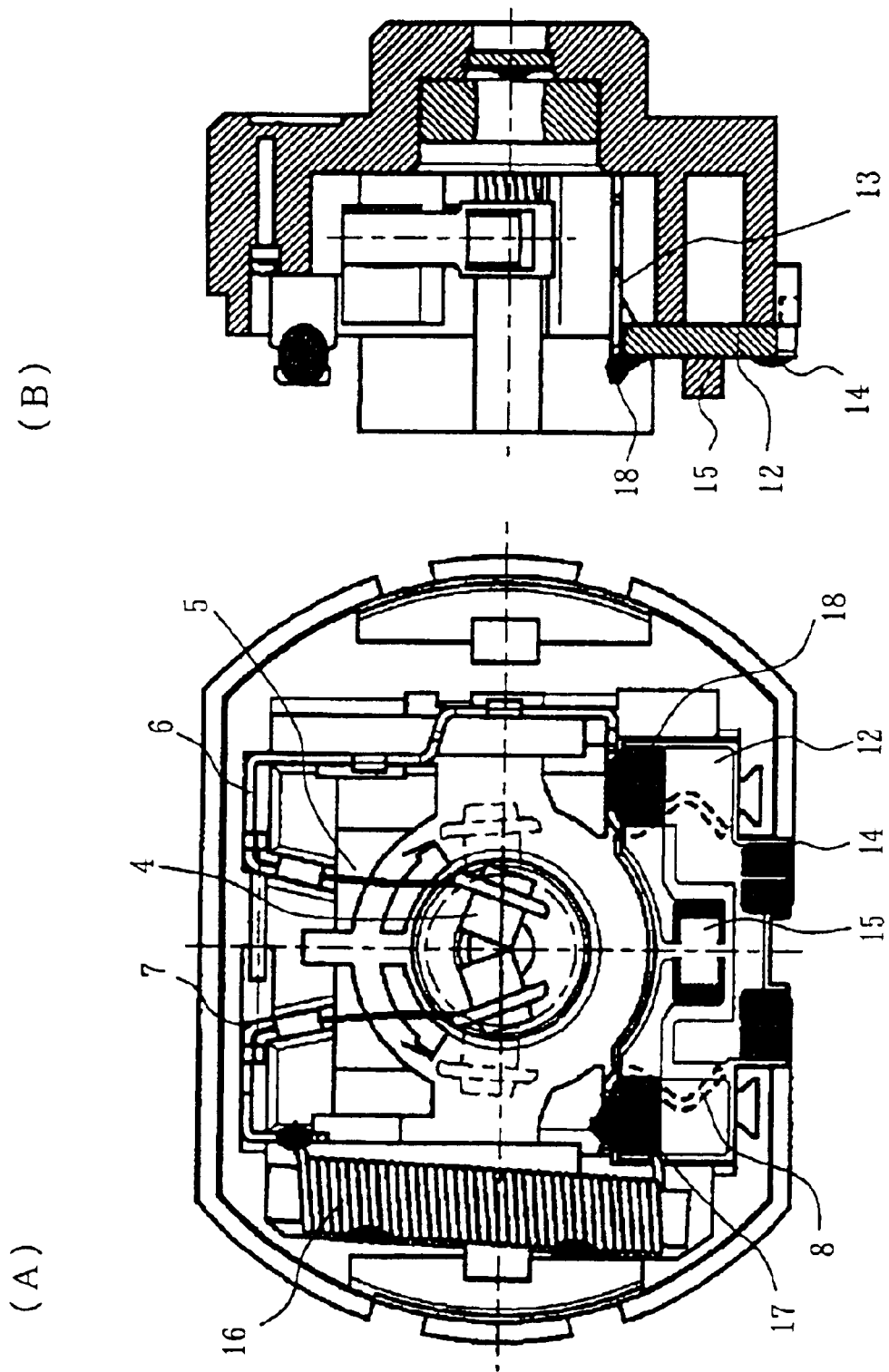
FIG. 3 is a view showing only a case cover of a small-sized motor shown in FIG. 1.

FIG. 3 is a view showing only a case cover of a small-sized motor shown in FIG. 1. FIG. 3A is a view of an interior seen from an inside direction of the case cover, and FIG. 3B is a cross sectional view made by cutting the case cover shown in FIG. 3A at the center. As shown in the drawing, the brush device is made of a pair of carbon brushes 4 coming into sliding contact with the commutator, brush arms 5 where they are respectively pressed and held, and brush bases 6, 7 connected to these brush arms 5 by caulking or the like.

In the synthetic resin case cover 11, the brush device structured like this is pressed and held in the concave place limited by the columned part integrally formed with that. The electric power source supply to this brush device is performed through a pair of brush springs 8 functioning as the receptacle terminals coming into electric contact with a pair of external terminals inserted from the outside through the external terminal inserting holes. At that moment, one brush spring is connected to the brush base 6 electrically directly, and the other brush spring is connected to the brush base 7 in series through the choke coil 16.

The above described attachment configuration of the brush device and electric power source supply configuration thereto can be made by a conventionally well known normal technique. The present invention is characterized by such a structure where to the case cover of a small-sized motor to which a brush device like this is attached, a printed board 12 to which an electric circuit element for the reduction of noise is attached is furthermore mounted, and in the meantime, the earth of this electric circuit is body-earthed to the metal case.

Figure 2:
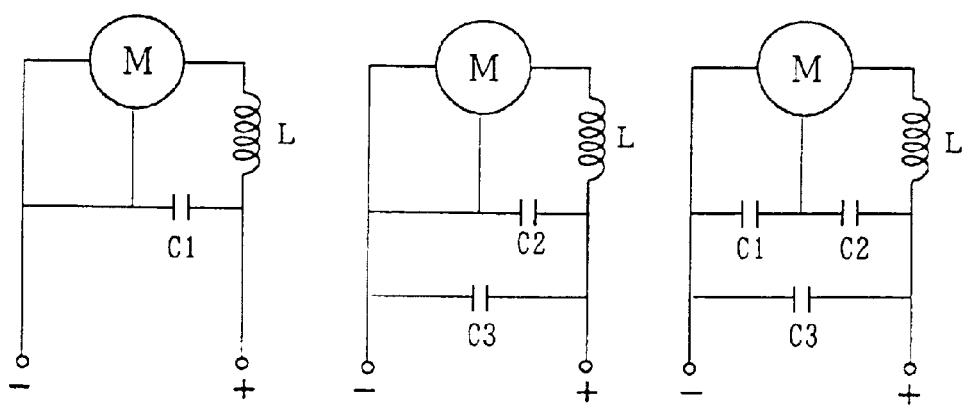
FIG. 2 exemplifies a typical electric circuit used for a reduction of noise.

In FIG. 2, a typical electric circuit used for the reduction of noise is exemplified. Three circuits shown in (A) to (C) themselves are well known, but which circuit should be used (or whether another circuit should furthermore be used) is determined by the target value of how much the electric noise should be reduced. A choke coil L of the circuit element shown in the drawing can directly be attached to the case cover as mentioned above (refer to the choke coil 16 shown in FIG. 3 (A)). Chip capacitors C1 to C3 except for the choke coil L and the winding thereof are put into practice by using the printed circuit.

Figure 5:
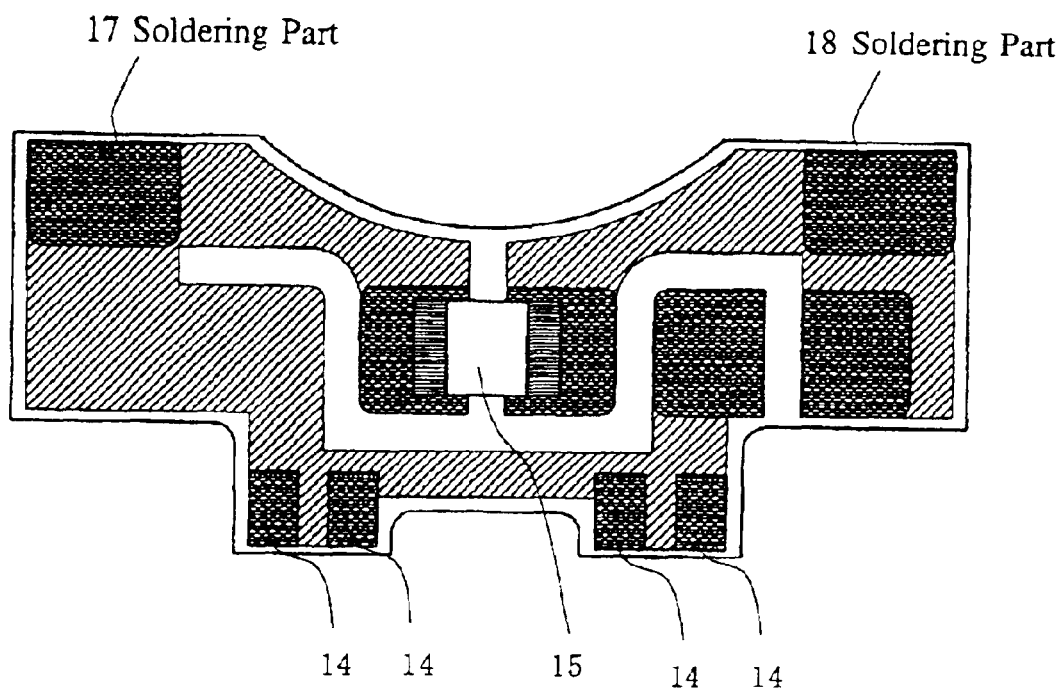
FIG. 5 is a view exemplifying a printed board.
Figure 6:
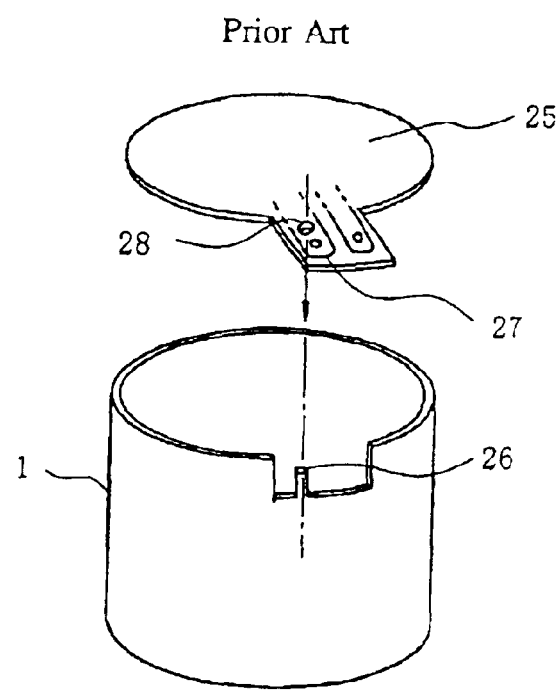
FIG. 6 is a view for explaining a printed board mounting method based on the prior art.

FIG. 5 is a view exemplifying the printed board. In the case of the exemplified printed board, in order to make the circuit shown in FIG. 2A, as an electric element, only one chip capacitor 15 is attached. By using the printed board, for example, at the time of changing from the circuit shown in FIG. 2A to the circuit shown in FIG. 2B or FIG. 2C, or to another circuit, the changing can be performed only by changing the printed board itself where the circuit element is assembled without changing the assembled structure of the case cover at all.

In FIG. 5, a slant hatching portion shows a winding portion on the printed board, and the soldering is performed at a black portion. In soldering parts 17, 18, the soldering is performed with the extension parts 13 extending upward from the end parts of a pair of brush springs 8. Consequently, not only being electrically connected but also the printed board pressed and held in the concave place limited by the columned part formed integrally with the synthetic resin case cover is mechanically surely fixed in the case cover by this soldering. Consequently, the assembling of the case cover itself is finished, and after that, the step advances to the assembling step of the total of the small-sized motor.

At the time of assembling the small-sized motor, a metal case to which a magnet is attached, a rotor where the assembly is completed, and a case cover where the assembly is completed are prepared. Then, after letting one end of the rotor shaft pass through the bearing at the metal case bottom part, the case cover is fitted to the opening part of the metal case, and after that, not only the soldering part 14 on the printed board is mechanically connected to the projection in the notch provided to the case cover to be described later by soldering but also it is body-earthed, so that the assembling as the small-sized motor is completed.

Figure 4:
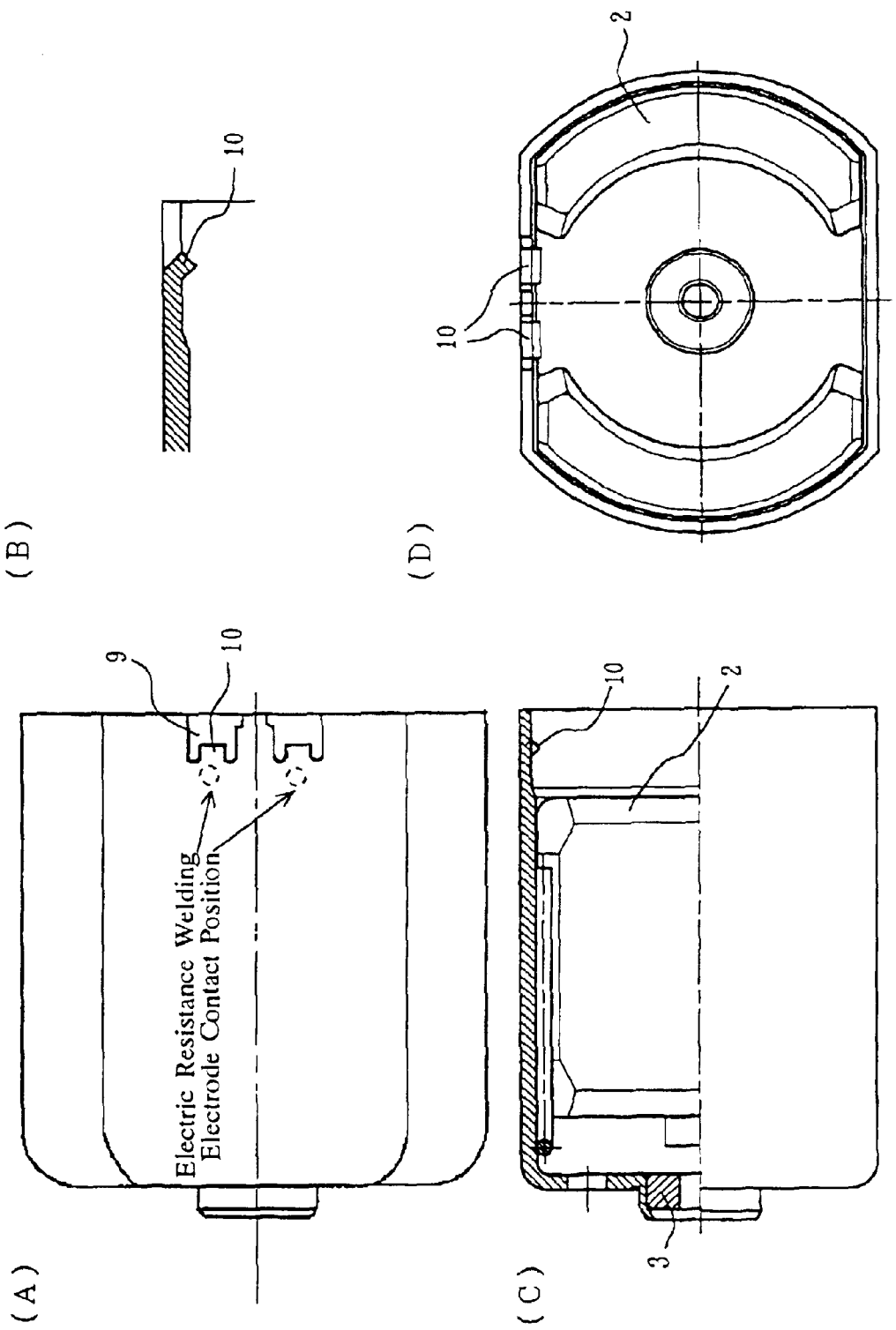
FIG. 4 is a view showing a metal case.

This soldering will furthermore be described by referring to FIG. 4. FIG. 4 is a view showing the metal case, and FIG. 4D is a view made by seeing an interior from an opening part of the metal case, and a view made by seeing this drawing (FIG. 4D) from the upper side is FIG. 4A, and a view showing that by an upper half cross section seen from the side is FIG. 4C. FIG. 4B is a view showing an expanded projection 10 provided on the opening part side of the metal case.

The projection 10 in the notch 9 provided to the metal case is provided at such a position where the soldering part 14 on the printed board comes into contact with this projection 10 when the case cover is fitted to the metal case opening part. At the soldering part 14, solder of a specified amount is already heaped up in advance before fitting the case cover. The tip of the projection 10 is positioned at a place retreated from the metal case opening part end surface by an amount approximately equal to the amount by which the soldering part 14 is made higher with the heaped solder. As exemplified, two projections 10 are provided in the notches 9, and furthermore, corresponding thereto, the soldering parts 14 are provided at four places (refer to FIG. 5), and it is an object of this to make the body-earth and the mechanical connection surer, and each one can sufficiently functions. Furthermore, as clearly shown especially in FIG. 4B, in the case of this projection 10, the tip side thereof is bent in the metal case interior direction. It is undesirable from the point of view of the beauty that the solder runs over in the outside direction of the case at the time of performing the soldering to be described later, but by bending the tip side in the inside direction like this, the solder can be prevented from running over in the outside direction of the case.

When the case cover is fitted to the metal case opening part, the projection 10 comes into contact with the soldering part 14 on the printed board, and even if part thereof bites in, the connection is not completed yet in this state. In order to complete this, the solder is melted by the principle of the electric resistance welding to make the contact and the connection more stable. This electric resistance welding is performed by bringing a pair of electrodes for the electric resistance welding into contact with a part where heating is necessary, that is, a place near the projection 10 (refer to FIG. 4A). However, as mentioned above, the electric resistance welding is performed after fitting the case cover to the metal case. By letting the electric current flow through these electrodes, the heating is performed between the electrodes because of the electric resistance included in the steel metal case, and the heat thereof is transmitted to the projection 10, and consequently, the solder is melted by the principle of the electric resistance welding, and the welding is performed.

The present invention makes it possible to easily and surely body-earth the earth of the electric circuit made of the electric element such as a chip capacitor attached on a printed board mounted to a case cover, to a metal case.

Furthermore, the present invention makes it possible to reduce the number of motor assembling steps to perform the assembling with a good workability.

Furthermore, the projection in the notch can prevent the solder from running over in the outside direction of the case by bending the tip side thereof in the metal case interior direction.

What is claimed is:

1. A manufacturing method for forming a small-sized motor, the method comprising steps of:

providing a hollow cylindrical metal case having a bottom and having an open end;

attaching a magnet to an inside periphery of the hollow cylindrical metal case;

forming a rotor by providing a shaft with a laminated core, providing a winding wound around the laminated core and attaching a commutator to the shaft;

inserting the rotor into the hollow cylindrical metal case;

providing a synthetic resin case cover;

providing printed boards including a circuit board having an electric circuit including an electric element mounted thereto and another circuit board having an electric circuit including plural electric elements mounted thereto, each printed board being provided with a soldering part for connection to a member attached to the interior of the case cover for being connected to an electric power source supplied from the outside and a body ground soldering part for connection to a projection in a notch provided on the open end side of said metal case for a body ground for the electric circuit;

selecting one of the circuit boards and attaching the selected printed board to the synthetic resin case cover;

fitting the synthetic resin case cover to the case to close the open end of the case;

after fitting said case cover to the metal case open end applying a pair of electrodes to contact the metal case from the outside near a location of the ground soldering part to weld the ground soldering part by electric resistance welding to the case.

2. The manufacturing method of a small-sized motor according to claim 1, wherein the tip side of said projection in the notch is bent in the case interior direction.

* * * * *